(12) United States Patent
Cohen et al.

(10) Patent No.: US 6,654,741 B1
(45) Date of Patent: Nov. 25, 2003

(54) URL MAPPING METHODS AND SYSTEMS

(75) Inventors: Ariye M Cohen, Seattle, WA (US); Rico Mariani, Kirkland, WA (US); Sanjeev K Rajan, Kirkland, WA (US); Bassam Tabbara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/304,133

(22) Filed: May 3, 1999

(51) Int. Cl.$^7$ .............................. G06F 17/30
(52) U.S. Cl. .............................. 707/6; 707/4
(58) Field of Search .............. 707/6, 2, 4, 10; 709/203, 223; 345/328

(56) References Cited

U.S. PATENT DOCUMENTS

| | | | | |
|---|---|---|---|---|
| 5,717,860 A | * | 2/1998 | Graber et al. | 709/227 |
| 5,761,683 A | * | 6/1998 | Logan et al. | 707/513 |
| 5,864,676 A | * | 1/1999 | Beer et al. | 709/229 |
| 5,864,863 A | * | 1/1999 | Burrows | 707/103 |
| 5,958,008 A | * | 9/1999 | Pogrebisky et al. | 709/223 |
| 6,038,603 A | * | 3/2000 | Joseph | 709/228 |
| 6,061,738 A | * | 5/2000 | Osaku et al. | 7090/245 |
| 6,094,649 A | * | 7/2000 | Bowen et al. | 707/3 |
| 6,119,078 A | * | 9/2000 | Kobayakawa et al. | 704/3 |
| 6,119,153 A | * | 9/2000 | Dujari et al. | 709/218 |
| 6,122,647 A | * | 9/2000 | Horowitz et al. | 707/513 |
| 6,208,986 B1 | * | 3/2001 | Schneck et al. | 707/3 |
| 6,271,840 B1 | * | 8/2001 | Finseth et al. | 345/349 |
| 6,297,819 B1 | * | 10/2001 | Furst | 345/733 |
| 6,321,227 B1 | * | 11/2001 | Ryu | 707/10 |
| 6,345,278 B1 | * | 2/2002 | Hitchcock et al. | 707/100 |

* cited by examiner

*Primary Examiner*—John Breene
*Assistant Examiner*—Cheryl Lewis
(74) *Attorney, Agent, or Firm*—Lee & Hayes, PLLC

(57) ABSTRACT

The invention provides for flexible, convenient, and dynamic URL mapping methods and systems by providing generalized approaches which specify patterns in term of recognizable syntax. The recognizable syntax can be defined by one or more rules. The rules are used and applied to an input URL string which is provided by a client to map the input URL string to an output URL string which is used by a rendering engine to provide a requested resource. Embodiments of the invention provide for a rule cache or internal store in which rules are kept. The rule cache allows for rules to be added, deleted, or modified as desired, without the need to stop and re-start the web service. The rule cache can be populated dynamically at run time. In addition, embodiments of the invention conveniently group rules into rule groups. Individual rule groups can be selectively applied to an input URL string. Furthermore, reverse mapping is supported by embodiments of the invention simply through the use of suitable rule additions or rule group additions in the rule cache, as may be appropriate.

46 Claims, 7 Drawing Sheets

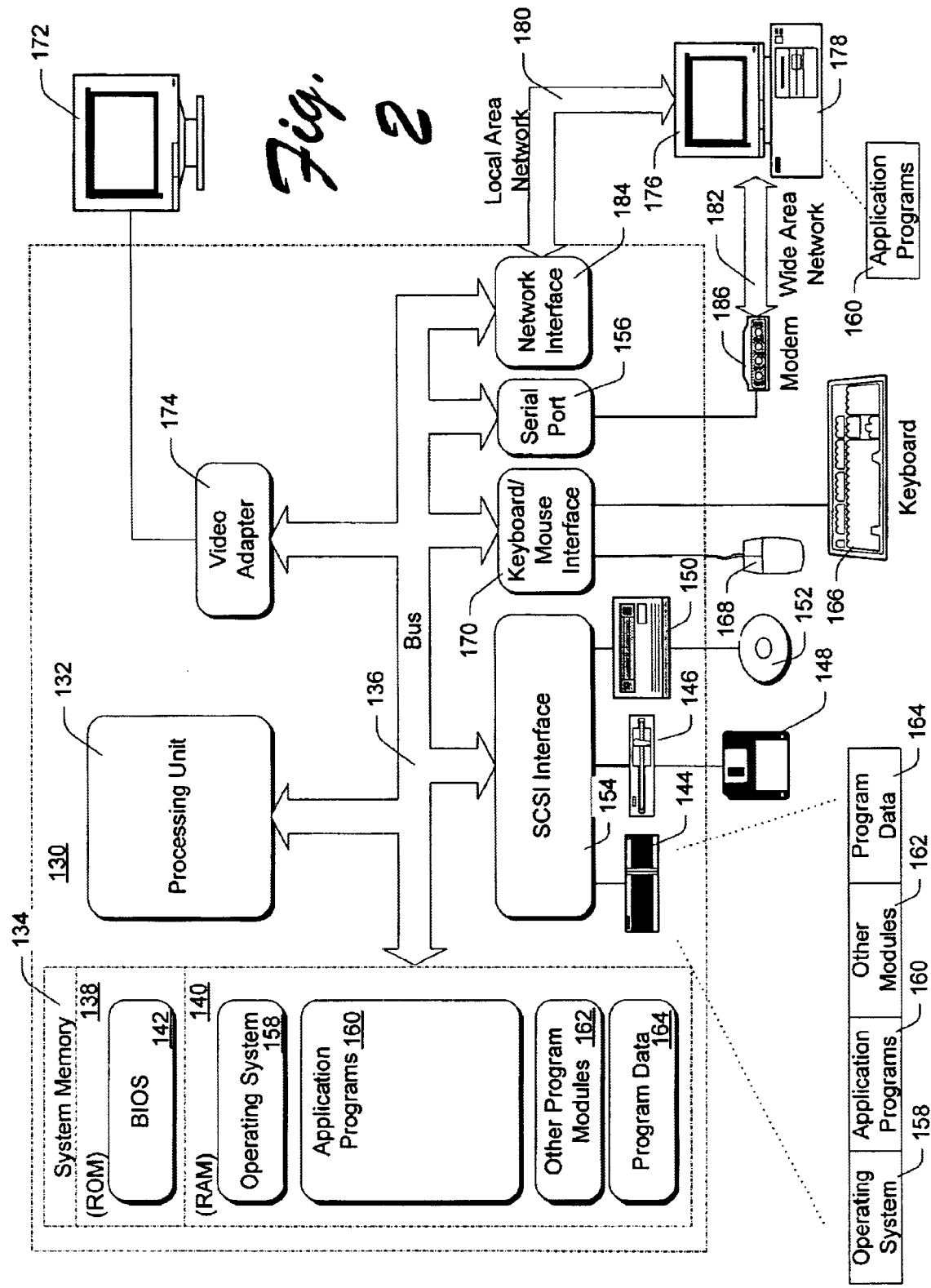

Regular Expression Escape Characters:

| | |
|---|---|
| + | – At least one or more of the preceding characters or expressions. For example, ba+c matches bac, baac, but not bc. |
| [ ] | – Any one of the characters contained in the brackets, or any of an ASCII range of characters separated by a hyphen (-). For example, b[aeiou]d matches bad, bed, bid, bod, and bud (but not bead or beed) and r[eo]+d matches red, rod, reed, rood, reod, roed, reood, roeod, etc. |
| ^ | – The beginning of a line |
| $ | – The end of a line |
| * | – None or more of the preceding characters or expressions. For example, ba*c matches bc, bac, baac and so on. |
| [^] | – Any character except those following the caret (^) character in the brackets, or any of an ASCII range of characters separated by a hyphen (-). For example, x[^0-9] matches xa, xb, xc, and so on, but not x0, x1, x2, and so on. |
| ( ) | – Indicates a tagged expression to retain for replacement purposes. Each occurrence of a tagged expression is numbered according to its order and its replacement expression is \n, where 1 corresponds to the first tagged expression, 2 to the second, and so on. |
| ( )\:n | – (n is an integer between 1 and 255) Indicates a tagged expression (as above) that needs to be used as the n$^{th}$-input parameter for an external LookUp() function. |
| {c!c} | – Any one of the characters separated by the alternation symbol (\!). For example, {j!u}+fruit matches jfruit, ufruit, jjfruit, ujfruit etc. |
| {} | – Any sequence of characters between the escaped braces. For example, {ju}+fruit matches jufruit, jujufruit but not ufruit, jfruit or ujfruit |
| \:a | – Any single alphanumeric character [a-zA-Z0-9] |
| \:c | – Any single alphabetic character |
| \:d | – Any decimal digit [0-9] |
| \:z | – Any unsigned decimal integer [0-9]+ |
| \:h | – Any hexadecimal number [0-9a-fA-F]+ |
| \:w | – Any alphabetic string [a-zA-Z]+. The string need not be bounded by white spaces or appear at the beginning or the end of a line |
| \:q | – Any quoted string {"[^"]*!'[^']*'} |
| \N | – (N is a digit) The sub-string in the target that matched the nth-tagged expression |
| \ | – Escape character to remove the pattern match characteristics from the special characters listed above. For example, 100$ matches 100 at the end of a line, but 100\$ matches the character string 100$ anywhere on a line. |

*Fig. 3*

Group ID = 1, Group Tag = Match One, Group bit-mask = 0x01

| Rule ID | Rule Action Type | Input Expression | Output Expression |
|---|---|---|---|
| 1 | N | ^Sidewalk.com/([^/]+) | /scripts/city.dll?city=\1 |
| 2 | N | ^Sidewalk.com:/([^/]+) | /scripts/city.dll?city=\1 |
| 3 | N | ^Sidewalk.com:80/([^/]+) | /scripts/city.dll?city=\1 |
| 4 | N | ^([^.]+)/([^/]+) | /scripts/city.dll?city=\2 |
| 5 | N | ^([^.]+):/([^/]+) | /scripts/city.dll?city=\2 |
| 6 | N | ^([^.]+):80/([^/]+) | /scripts/city.dll?city=\2 |
| 7 | N | ^([^.]+).sidewalk.com | /scripts/city.dll?city=\1 |
| 8 | N | ^([^.]+).sidewalk.com: | /scripts/city.dll?city=\1 |
| 9 | N | ^([^.]+).sidewalk.com:80 | /scripts/city.dll?city=\1 |
| 10 | N | ^Www.([^.]+).sidewalk.com | /scripts/city.dll?city=\1 |
| 11 | N | ^Www.([^.]+).sidewalk.com: | /scripts/city.dll?city=\1 |
| 12 | N | ^Www.([^.]+).sidewalk.com:80 | /scripts/city.dll?city=\1 |

Fig. 5

Group ID = 2, Group Tag = Match One, Group bit-mask = 0x02

| Rule ID | Rule Action Type | Input Expression | Output Expression |
|---|---|---|---|
| 1 | N | /$ | &LID=1 |
| 2 | N | /link/(\z)$ | &LID=\1 |
| 3 | N | /link/(\z)/$ | &LID=\1 |
| 4 | N | /link/(\z)/(\w)$ | &\2&LID=\1 |
| 5 | N | /link/(\z)?(\w)$ | &\2&LID=\1 |
| 6 | N | /detail/(\z)$ | &EID=\1 |
| 7 | N | /detail/(\z)/$ | &EID=\1 |
| 8 | N | /detail/(\z)/(\w)$ | &\2&EID=\1 |
| 9 | N | /detail/(\z)?(\w)$ | &\2&EID=\1 |
| 10 | N | /([^/]+)\:1$ | &EID=\(frlkup, 1) |
| 11 | N | /([^/]+)\:1/$ | &EID=\(frlkup, 1) |
| 12 | N | /([^/]+)\:1/(\w)$ | &\2&EID=\(frlkup, 1) |
| 13 | N | /([^/]+)\:1?(\w)$ | &\2&EID=\(frlkup, 1) |

*Fig. 6*

| Rule ID | Rule Action type | Input Expression | Output Expression |
|---|---|---|---|
| 1 | N | ^Sidewalk.com/([^/]+)\:1 | city.dll?scopeid=\(scope, 1) |
| 2 | N | ^Sidewalk.com:/([^/]+)\:1 | city.dll?scopeid=\(scope, 1) |
| 3 | N | ^Sidewalk.com:80/([^/]+)\:1 | city.dll?scopeid=\(scope, 1) |
| 4 | N | ^([^.]+)/([^/]+)\:1 | city.dll?scopeid=\(scope, 1) |
| 5 | N | ^([^.]+):/([^/]+)\:1 | city.dll?scopeid=\(scope, 1) |
| 6 | N | ^([^.]+):80/([^/]+)\:1 | city.dll?scopeid=\(scope, 1) |
| 7 | N | ^([^.]+)\:1.sidewalk.com | city.dll?scopeid=\(scope, 1) |
| 8 | N | ^([^.]+)\:1.sidewalk.com: | City.dll?scopeid=\(scope, 1) |
| 9 | N | ^([^.]+)\:1.sidewalk.com:80 | City.dll?scopeid=\(scope, 1) |
| 10 | N | ^www.([^.]+)\:1.sidewalk.com | City.dll?scopeid=\(scope, 1) |
| 11 | N | ^www.([^.]+)\:1.sidewalk.com: | City.dll?scopeid=\(scope, 1) |
| 12 | N | ^www.([^.]+)\:1.sidewalk.com:80 | City.dll?scopeid=\(scope, 1) |

URL MAPPING METHODS AND SYSTEMS

TECHNICAL FIELD

This invention relates to methods of mapping URLs and to related URL-mapping systems.

BACKGROUND OF THE INVENTION

URLs or universal resource locators are used to access resources which can be provided over a communications network such as the Internet. URLs are simply formatted strings that identify particular resources. Typically, a user or client will send a URL to a network server that will respond by sending the requested resource, such as a web page, back to the client. URLs that are provided by a client sometimes have a different, simpler form than those that are used by the server and/or web-site rendering engine that provides the requested resource. For example, a client-provided URL might take the following form: http://<hostname>/<Abs Path>, where the "hostname" is a network host domain name or address, and "Abs Path" is the location of the resource requested. The location could be a simple directory path to a .htm file, or a list of parameters that the web site rendering engine can act upon to generate HTML-formatted content. Yet, the URL which is used by the web-site rendering engine is often much more complex in form than the client-provided URL. For example, the form used by the rendering engine might take the following form: <Abs Path>/script/foo.dll/<identifier>. The URL form that is used by different rendering engines can really take many forms, and contain the required details that are necessary for the rendering engine to find or generate the requested resource. It is desirable for this more complex URL form to be transparent to the client. This way, the client need only see and/or provide the more simple "user-friendly" URL to the server or web-site rendering engine. Additionally, the underlying complex URL may in fact change over time, while it is desirable for the external form of the URL to remain unchanged so as to not affect customers of the service.

Against this backdrop, a need has arisen for a solution to the problem of translating or mapping the simpler, user-friendly URLs into the more complex URLs needed by a rendering engine. Attempts in the past have failed to provide truly flexible, convenient, and dynamic solutions. For example, one past solution was a so-called hard-coded approach which simply provided fixed software code with built-in logic to handle the desired mappings. One way of doing this is to provide a series of IF, THEN statements or a CASE statement to handle the mapping. Problems associated with this approach include that the set of mappings which is supported is fixed, and any changes, such as adding new mapping statements, or modifying existing mapping statements, requires the code to be modified or rewritten. This, in turn, results in a large turn around time which is highly undesirable. In addition, the web service must typically be stopped and restarted which is undesirable and unacceptable for large web-sites that see a large amount of traffic. Moreover, building the rule-mapping logic into the code makes it difficult to have any hierarchical organization of the rules, or to support reverse mapping of the rules. So, in short, the solutions which have been proposed and implemented to date do not provide the flexibility, convenience, and dynamic performance which is so desirable, and in fact, necessary in the current operating environment.

SUMMARY OF THE INVENTION

The invention provides for flexible, convenient, and dynamic URL mapping methods and systems by providing generalized approaches which specify patterns in term of recognizable syntax. The recognizable syntax can be defined by one or more rules. The rules are used and applied to an input URL string which is provided by a client to map the input URL string to an output URL string which is used by a rendering engine to provide a requested resource.

Embodiments of the invention provide for a rule cache or internal store in which rules are kept. The rule cache allows for rules to be added, deleted, or modified as desired, without the need to stop and re-start the web service. The rule cache can be populated dynamically at run time. In addition, embodiments of the invention conveniently group rules into rule groups. Individual rule groups can be selectively applied to an input URL string. Furthermore, reverse mapping is supported by embodiments of the invention simply through the use of suitable rule additions or rule group additions in the rule cache, as may be appropriate.

BRIEF DESCRIPTION OF THE DRAWINGS

FIG. 2 is a diagram of a computer that is suitable for use in connection with one or more embodiments of the invention.

FIG. 3 is a table which defines so-called special characters in accordance with one or more embodiments of the invention.

FIG. 5 is a table which provides a collection of rule groups in accordance with one embodiment of the invention.

FIG. 6 is table which provides a collection of rule groups in accordance with one embodiment of the invention.

FIG. 7 is table which provides a collection of rule groups in accordance with one embodiment of the invention.

DETAILED DESCRIPTION OF THE PREFERRED EMBODIMENTS

Figure 1:
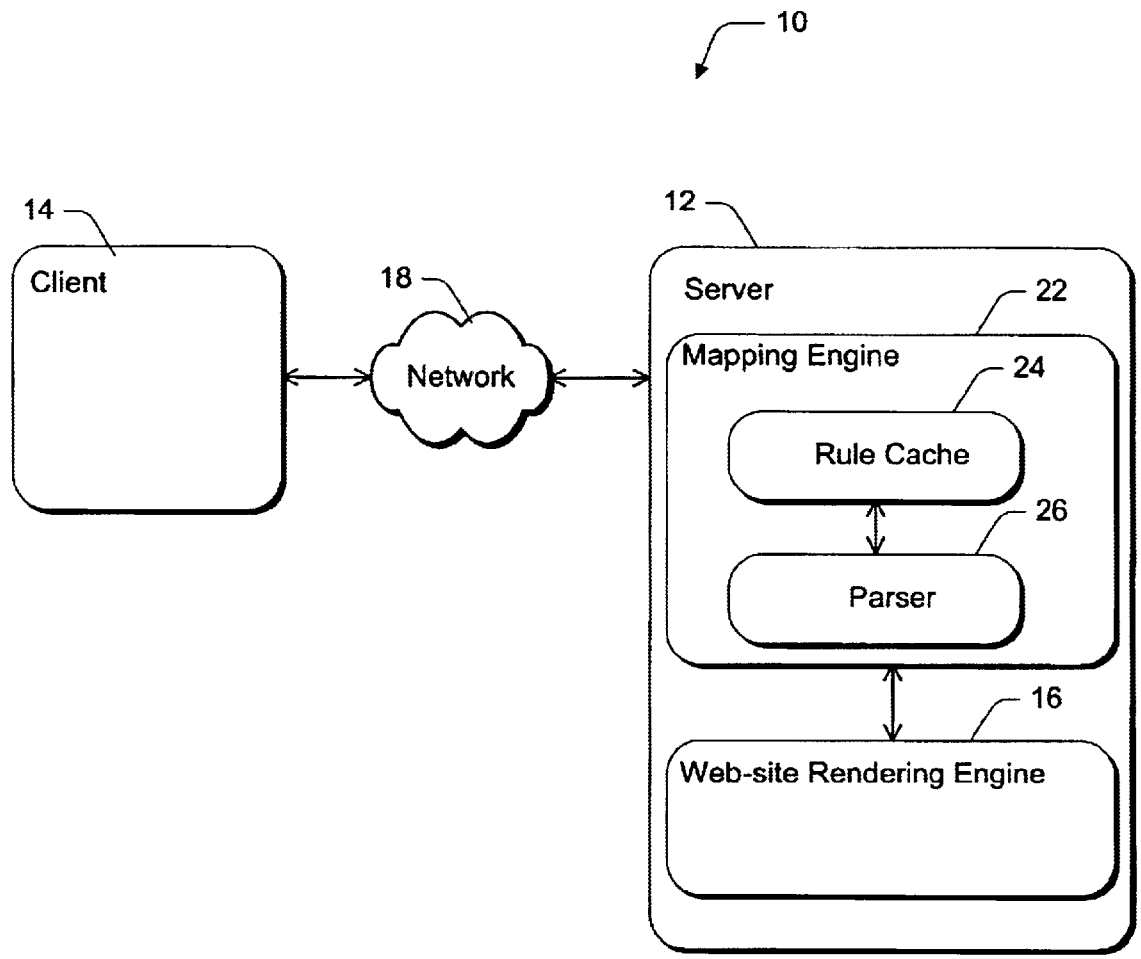
FIG. 1 shows a communication network which is suitable for use with one or more embodiments of the invention.

FIG. 1 shows a communication network 10 in which processing can take place in accordance with the embodiments of the invention described just below. An exemplary communication network is the Internet. The discussion which takes place below assumes some familiarity with the Internet, and World Wide Web practices, formats, and protocols. A great number of books are available on these subjects. Stout, Rick, *The World Wide Web: Complete Reference*, McGraw-Hill, 1996, is one example.

Communication network 10 includes a server 12 and a client 14. The client and server communicate over a communications medium or link such as the Internet 18 or some other network medium.

In the described embodiment, server 12 is an Internet information server. A web-site rendering engine 16 runs on server 12. The web-site rendering engine is responsible for rendering or providing a resource that is requested by client 14. The request for the resource includes an input URL string or user-friendly URL that is in a simple form or easily recognizable form, an example of which was given above.

A mapping engine 22 also executes on server 12 and initially receives the input URL string. In the illustrated example, mapping engine 22 includes a rule cache 24 and a parser 26. Rule cache 24 includes one or more rules which are applied to the input URL string. Parser 26 performs parsing functions on the input URL string. The result of the operations of rule cache 24 and parser 26 is an output URL string which is provided to web-site rendering engine 16. The output URL string is in a form which can be understood by web-site rendering engine 16. Web-site rendering engine 16 responds by performing the appropriate operations to generate and return the requested resource to client 14 via a response which is sent over communication medium 18.

FIG. 2 shows a general example of a desktop computer 130 that can be used in accordance with the invention. A computer such as that shown can be used for any of the client computers 14 and server 12.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during startup, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Although FIG. 1 show all of these functions being performed within a single server computer, it is likely that actual embodiments will involve several server computers acting together to satisfy requests of large numbers of clients. Furthermore, the various functions described might be distributed among more than one computer. Also, the mapping engine and web-site rendering engine in the described embodiment are designed to work in conjunction with a Microsoft product called "Internet Information Server." This product performs many of the management functions of a web server, while allowing customization through the use of so-called "filters" and "extensions". Mapping engine 22 is implemented as an ISAPI (Internet Server Application Programming Interface) filter for use in conjunction with Microsoft's Internet Information Server. Web-site rendering engine 16 is implemented as an "extension," again for use with Internet Information Server.

As a preliminary matter, the following discussion will use the terminology below:

"Input String" is a URL or other string as received by the server from a client. This is typically a user-friendly or "friendly" URL that has been designed for easy recognition and/or recall by human users. This string is passed to the mapping engine for translation into an "unfriendly" format that is appropriate for web-site rendering engine 16.

"Output String" is the URL or other string that is output by mapping engine 22 in response to the input string. This string is formatted as appropriate for the web-site rendering engine.

"Input Expression" is an expression that is compared with input strings to determine an appropriate mapping. In the described embodiment, an input expression is formatted syntactically in a manner that allows specification of both identity and variability among constituent parts of an input string. Thus, the input expression can include literal parts that call for an exact character-by-character match between those parts and corresponding parts of the input string, and variable parts that allowed for inexact matches or no match at all between those parts and corresponding parts of the input string. An input string is said to "match" an input expression when there is a correspondence between the literal and variable parts of the input string and input expression.

"Output Expression" is an expression that is paired with an input expression and that is used to create an output string when there is a match between the input string and the input expression. In the described embodiment, the output expression allows parts of the input string to be specified in the output string. Specifically, the parts of the input string corresponding to variable parts of the input expression can be specified as parts of the output string.

In any particular server, a plurality of input expressions are defined in accordance with a predefined syntax. The predefined syntax makes use of pattern matching rules. In the described embodiment, this syntax utilizes complex pattern matching rules known as regular expressions. A regular expression comprises a character string in which literal characters indicate text that must exist identically in an input URL string. Regular expressions can also include special characters to indicate portions of an input string in which variability is allowed.

As an example, assume that it is desired to map the "friendly" URL input string "seattle.sidewalk.com" to "sidewalk.com/script/foo.dll/seattle". Assume further that similar mappings are to be made for other cities, such as Portland, Cincinnati, etc.

Generally, a matching input string will be any string in which some undefined characters precede the string ".sidewalk.com". Using a simple form of pattern matching rules, this might be expressed as the following input expression: "*.sidewalk.com". The "*" indicates any combination of characters, while the following literal characters (".sidewalk.com") are to be matched character-by-character with the input string.

To produce the appropriate output string, an output expression corresponding to the input string, is formulated as a replacement template. In this example, the output expression might be "sidewalk.com/script/foo.dll/*". The "*" in an output string is an identifier and represents whatever characters corresponded to the "*" in the input string. In this example, the corresponding characters would have been those of the string "seattle". Thus, this output expression would generate the output string "sidewalk.com/script/foo.dll/seattle." It should be apparent that the same input/output expression pair would work with any city specified by a user. This example illustrates a fairly simple and easily understandable syntax. However, more powerful syntax can be used and are often desirable.

FIG. 3 shows one example of more a complex set of pattern matching rules known as regular expressions that define a plurality of special characters for specifying variability in an input expression. Regular expressions in accordance with this syntax include so-called escape characters whose meanings are shown. The use of these regular expressions in mapping engine 22 provides a great deal of generality and flexibility in specifying input expressions.

Figure 4:
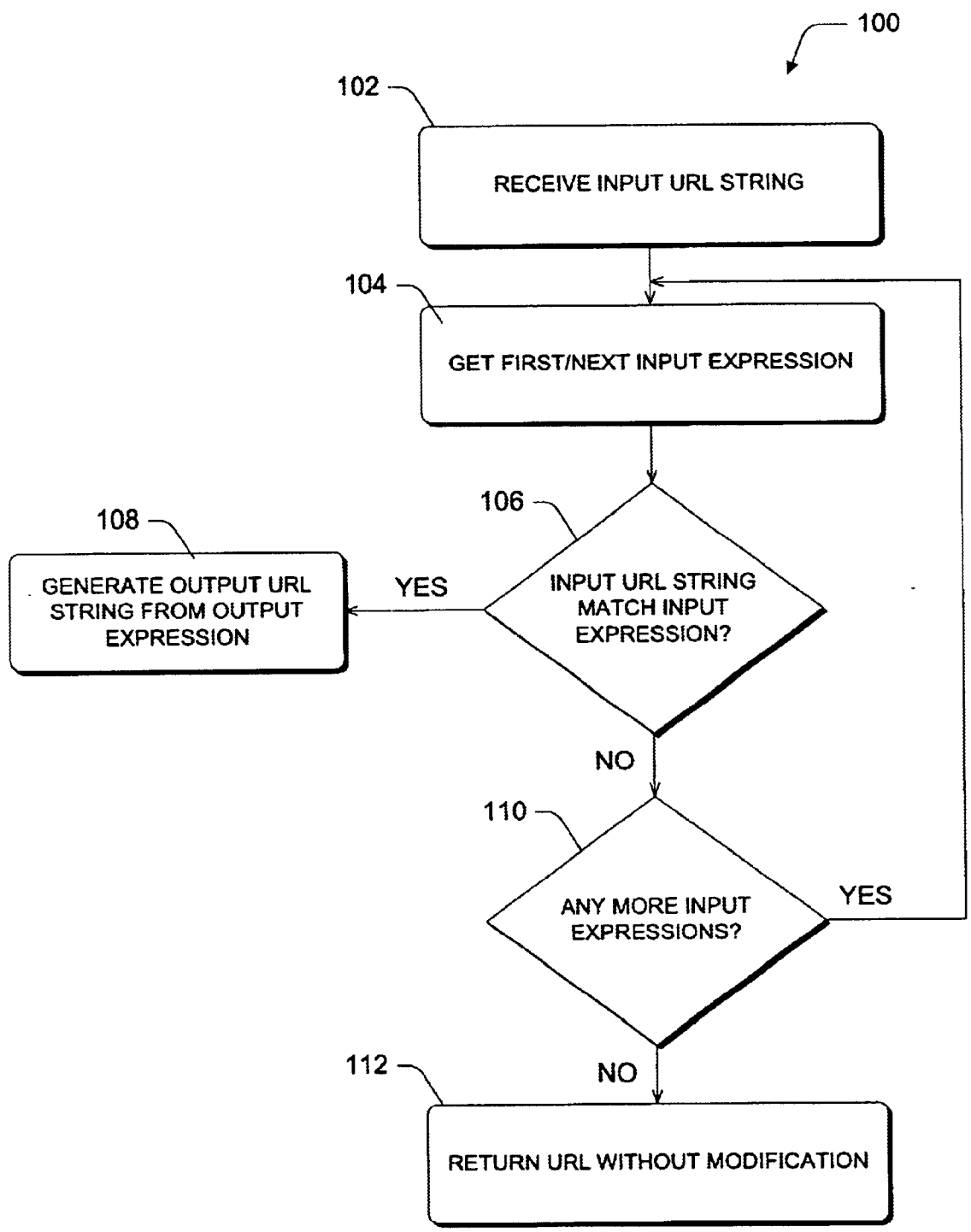
FIG. 4 is flow diagram which describes methodical aspects in accordance with one or more embodiments of the invention.

FIG. 4 shows a flow diagram generally at 100 that describes certain methodical steps in accordance with an embodiment of the invention. At 102 an input URL string is received by server 12 from a client 14 (FIG. 1). Server 12 accesses a plurality of input expressions, each of which is associated with an output expression. At step 104 the input URL string is compared with an input expression. This involves searching the input URL string for a particular pattern that is defined by the input expression. If the input URL string matches the input expression at 106, then the procedure branches to a step 108 of generating an output URL string or pattern from the output expression. The output expression might generate the output URL string by simply causing the mapping engine to conduct a string replacement, e.g. replacing "*" with "seattle", or by doing some additional work such as invoking a lookup procedure. The output URL string is then passed to web-site rendering engine 16, which responds by generating an appropriate web page or other resource. Formulation of the output URL string can take place through multiple transformations, in an iterative fashion, of the input URL string. For example, multiple rules (discussed below) could be used iteratively causing, for example, multiple transformations. If, at 106, the input URL string does not match an input expression, execution proceeds to step 110, which determines whether any more input expressions are available for comparing against the input URL string. If there are, execution loops back to step 104 and 106, in which the next input expression is identified and compared with the input URL string. The input expressions might be arranged in a particular hierarchical order so that the input expressions are checked in a stepwise fashion. If there are no more input expressions and there has been no match, then the procedure branches to 112 and returns the URL without modification.

In the described embodiment of the invention, mapping engine 22 stores a plurality of rules in its rule cache 24. Each rule comprises an input expression and an output expression. The rules are organized in groups. The rules of a particular group are designed for a particular purpose.

FIGS. 5–7 show three different groupings of rules that are established or defined using the regular expression syntax defined in FIG. 3. FIG. 5 shows a group of rules that can be used for mapping the hostname part of an input URL string. FIG. 6 shows a rule grouping that can be used for mapping the parameters part (e.g. the "Abs path" portion discussed above). FIG. 7 shows a rule grouping that supports a scoping function which is discussed below in more detail. A rule group consists of a set of zero or more rules. Each rule specifies a mapping of an input URL string to an output URL string using regular expression syntax.

Referring specifically to FIG. 5, each rule includes a Rule ID. Here, the Rule IDs number one through twelve. The Rule ID is a number that uniquely identifies a rule inside a rule group. Rules from different groups might take on non-unique Ids, but all rules within a certain group have unique IDs. Rules within each group are applied in the order of the Rule ID, which implies the order in which the rules were added to the group.

Each rule is also given a Rule Action Type. Three exemplary Rule Action Types are as follows:

"R" Repeat Rule
"A" Abort Mapping
"N" No Action

The Repeat Rule action forces a rule to be applied once again if the rule succeeds. The rule will get applied until the rule fails. The Abort Mapping action implies that if the concerned rule is successfully applied, the mapping process should be immediately aborted and a notification is sent to server 12. The No Action action implies that no special action should be taken if the rule concerned succeeds. That is, the processing of the input URL string should simply continue, i.e. continue following the prescription indicated by the current rule group.

Each rule also includes an input expression and an associated output expression. An input expression in the described embodiment is a regular expression in accordance with the syntax of FIG. 3. The output expression is a pattern in accordance with the syntax set forth in FIG. 3. The output expression can be a simple replacement string, or a string including special characters. A /n (where n is a digit [0–9]) in the output expression of a rule corresponds to the $n^{th}$-tagged expression in the input expression. This provides a convenient notation to extract variable strings from the input expression and insert them into the output expression.

A rule is satisfied or succeeds if each of the following events takes place: (1) the input URL string matches the input expression of the rule, based either on a simple string comparison, or a more complex regular expression search; and (2) an attempt to generate the output string based on the output expression succeeds. If a rule is successful, the Rule Action associated with the rule and the Group Tag (discussed below) of the concerned rule group determines what happens next. If this is the last rule in the last group, then this completes the mapping process.

FIG. 6 shows a rule grouping that can be used to map parameters of an input URL string. It might be desirable in some applications for the defined syntax to allow invocation of some external procedure such as a lookup procedure. In one embodiment, at least a portion of the output expression can be used to invoke a lookup procedure that produces a result. The result is used to produce an output URL string that is used by the web-site rendering engine to provide the requested resource. The lookup procedure can be invoked in any number of ways. One exemplary way is, to instantiate a LookUp object having an interface which supports the lookup procedure. By obtaining a pointer to the interface of the LookUp object, the pointer can be used to invoke the lookup procedure. In this example, the LookUp object might be a COM object. COM objects and interfaces are described in more detail in Brockschmidt, Kraig, *Inside OLE*, Second Edition, Microsoft Press, 1995. It should be noted, however, that the use of COM is in no way necessary to practice the invention, as any suitable object identification schema could be used (e.g. specifying the name of a run-time library file and an entry point, use of a non-COM object directory, etc.). In the illustrated rules, a new special character sequence is shown in the output expressions of Rules 10–13 as: "\(progid, N)", where "N" is a digit. The sequence invokes a LookUp function that takes the Nth tagged expression as its input. The string argument progid is used to create an instance of a LookUp Object that implements an interface ISWFriendlyLookup( ) that has LookUp( ) as one of its methods. Specifically, the progid obtained from the output expression is used to get the CLSID of the LookUp Object that implements the ISWFriendlyLookup interface. The mapping engine then calls CoCreatesInstance( ) (a "Windows" operating system call) using this CLSID in order to get a pointer to the ISWFriendlyLookup interface of this LookUp Object. Once the interface pointer is obtained, the mapping engine can cache the pointer for future use. The interface pointer is used to invoke the Lookup( ) method of that interface. The Lookup( ) method can take as input, any part of the input URL string for the mapping that matched the tagged expressions specified in the input expressions. The output of the Lookup( ) method is also a string which replaces the tagged expression in the output expression.

FIG. 7 shows a rule group that supports regional scoping. Here, instead of setting a parameter such as "city=seattle" in the URL, a LookUp function is used to resolve an incoming "virtual city name" into a ScopeID instead. The tagged expression syntax in the output expression indicates that a lookup needs to be performed. The mapping engine uses the string "scope" to search a LookUp Cache, and if an entry is found, the cached interface pointer is selected for the Object that implements the lookup method. Otherwise, the mapping engine creates an instance of that particular LookUp Object and then calls the LookUp( ) method. The LookUp( ) method can access a database, if necessary, and then returns a scope ID that replaces the tagged expression in the output expression. The rule is then considered successful.

As mentioned above, in order to provide for flexibility in the application of rules, the rules can be aggregated in sets to form one or more groups. In essence then, mapping engine 22 comprises a plurality of rule groups, each of which can contain one or more rules. Groups allow aggregation of rules that achieve one aspect of the mapping process into a group. For example, say an input URL stream needs to be decoded by replacing '+' with a space and '%xx' with the character corresponding to the hex value of xx. These operations form two separate rules that take care of one aspect of the URL mapping (that of preprocessing the URL) and can be grouped together in one group.

Groups have the following attributes: (1) Group ID, (2) Group Tag, and (3) Group Mask ID. These are shown for the rule groups in FIGS. 5 and 6.

The Group ID is a unique identifier for the group and is used to identify the group when rules are changed, i.e. added, deleted, or modified. The Group Tag specifies a protocol to use when applying the rules in a particular group. For example, a "match-all" tag specifies that all the rules in a group should be applied. That is, if a rule succeeds, the output of that rule becomes the input of its successor. A "match-one" tag specifies that mapping for that rule group should terminate as soon as a rule matches or succeeds. That is, the output for the rule that succeeds becomes the input of the next group (if one exists) to be considered for mapping. If a rule does not succeed, the output of the rule is the same as the input for the rule (as if the rule does not exist).

The Group Mask ID is a bit mask which is used during the mapping process. Each group is given a bit mask upon its creation. When a client needs to send a string for mapping, the client can specify a bit-mask key that is logically combined, e.g. ANDed, with the bit mask of each group. If the result of the logical combination is TRUE, then the group is included in the mapping process, otherwise it is skipped. This use of the Group Mask ID provides a convenient method of specifying which groups of rules need to get included in the mapping and which do not. An example of how this feature can be exploited is as follows.

It is desirable to have mapping which is bi-directional in the sense that where a given set of rules yields a particular output URL string from a given input URL string, there should be another set of rules in which that particular output URL string yields the given (i.e. the same) input URL string. When doing mapping in one direction, the rules for mapping in the other direction should not apply. One way to achieve this is to provide forward-mapping sets of rule groups with one Group Mask ID, and provide reverse-mapping sets of rule groups with another Group Mask ID. For example, assume groups 1, 2, and 3 have the forward-mapping rules, and groups 4, 5, and 6 have the reverse-mapping rules. Group Mask IDs can then be assigned to the respective groups as follows:

Group 1—0x0000 0001

Group 2—0x0000 0002

Group 3—0x0000 0004

Group 4—0x0000 0010

Group 5—0x0000 0020

Group 6—0x0000 0040

If the client requests for an input string to be mapped and specifies the bit-mask key to be "0x0000 0007", then a logical ANDing with the Group Mask IDs would result in only Groups 1, 2, and 3 getting included in the mapping. This would, in turn, provide for forward mapping. On the other hand, a bit-mask key of "0x0000 0070" would result in only Groups 4, 5, and 6 being considered in the mapping, and not groups 1, 2, and 3. In this case, reverse mapping would be applied.

As another example, consider a situation where rule groups are desired to be removed. If you want to change the rules, the best way to do it is to add the new rules (using bitmasks not currently in use), then once they are all successfully added, switch to using the new bitmasks and stop using the old ones. Subsequently, the old rule groups can be removed. In this way there is a clean move over to the new rule set.

In one specific implementation, a mapping system is provided through the use of Microsoft's Internet Information Server's extension facilities and Microsoft's COM methodologies mentioned above. For purposes in assisting in understanding this implementation, components of the mapping system and pertinent interfaces are described.

The mapping engine is implemented as an ISAPI filter. Hence, it implements the functions every ISAPI filter needs to implement, e.g. GetFilterVersion( ) and HttpFilterProc( ).

GetFilterVersion( ): This function is called only once when IIS (Internet Information Server) is started. It is used for exchanging version information between IIS and the mapping engine. The mapping engine also informs IIS of the notifications that it is interested in. Later, when a certain event occurs, IIS will invoke only those filters that have requested notification for that event.

HttpFilterProc( ): IIS notifies the mapping engine by calling HttpFilterProc( ) and passing it the notification types and a pointer to the structure corresponding to that notification. Using this pointer the mapping engine will gain access to the header information such as <hostname> and <abs_path> (the two parts of the URL discussed above).

The mapping engine is a COM server. This means that it can provide its services to anyone who can obtain a pointer to its appropriate interface. This results in generic, rule-based mapping capabilities. Some of the interfaces that can be used to populate and use the mapping engine are as follows:

SWFriendly Interface

This interface provides various methods for managing and using the mapping engine's rules. It provides support for adding new groups of rules to the rule cache and new rules to the groups. It can also provide support for loading rules from a file, and for storing rules back to a file so that the rules persist even after IIS is restarted. Other methods that can be supported can include methods for modifying and deleting rules. For example, "remove" operations that are analogous to the "Add" operations discussed just below can readily be added. A few examples of such methods are given below.

AddGroup( )—This method is used by the clients to add a new group to the rule cache. The client specifies a group tag and group mask Id as input parameters, and the method returns a group Id for the newly added group in the output parameter. The client can then use this group Id to add rules to this group.

```
HRESULT AddGroup
//---------------------------------------------------------
// Add a new group (or cache) of rules to Friendly
(
    EGroupTag eGroupTag,
    // [in] the group Tag (match one or match all)
    DWORD dwGroupMaskID,
    // [in] the group bit-mask ID. Used to decide whether
    // group is to be included in the mapping process
    DWORD * pdwGroupID
    // [out] the groupID generated for the new group
);
```

AddRule( )—This method is used to add a rule to a group that is identified by its group Id. The client provides the following: group Id of the group to which the rule is to be added, the action associated with the rule, the input expression and the output expression for the rule.

```
HRESULT CSWFriendly::AddRule
//---------------------------------------------------------
// Add a new rule to a certain Group.
(
    DWORD dwGroupID,
    // [in] GroupID identifying the group to which the
    // rule should be added
    ERuleAction eRuleAction,
    // [in] Action associated with this rule
    LPCSTR pszSrcString,
    // [in] Input Expression for the rule
    LPCSTR pszDestString
    // [in] Output Expression for the rule
);
```

ProcessURL( )—This method is called by the client to send an input URL string to the mapping engine. The client specifies a bit-mask that is used to decide which groups of rules are to be included for mapping.

```
HRESULT CSWFriendly::ProcessUrl
//---------------------------------------------------------
// Takes the incoming Url as input and sends it through
// the mapping engine. The input Url gets sent through each
// group of rules.
(
    LPCSTR pszUrl,
    // [in] Incoming Url
    DWORD dwBitMask,
    // [in] this parameter decides the set of groups that
    // get used for mapping
    LPSTR pszNewUrl
    // [in, out] Out Url
);
```

ISWFriendlyLookUp Interface

This interface provides a method for conducting a lookup procedure. Here, a rule can invoke a lookup procedure that gets its input from the input URL string. The output of this procedure is used in the output generated by the rule, e.g. an output URL string. Objects that implement this interface are referred to as Friendly Lookup Objects or FLOs. Each FLO has a CLSID and a ProgID and registers itself in the registry on compilation. A cache is provided and is referred to as the Friendly Lookup cache. The Friendly Lookup cache contains two fields in each entry—a progid (or a string) and a pointer to the ISWFriendlyLookup interface. When a rule needs to invoke the Lookup method of a FLO, it will use the FLO's ProgID to create an instance of it and will then cache the pointer to the interface in its cache for future references. Specifically, if the output expression of a rule has a tagged expression with the following syntax, it means that the rule requires a Lookup method to be invoked:

\(Foo, N)—where Foo is any string and N is an integer.

If the input URL string matches the input expression for a certain rule, and the output expression contains a tagged expression of the type shown above, the mapping engine performs the following steps:

1. It extracts the string in the tagged expression ("Foo" in the above case) and does a search in its lookup cache based on this string.
2. A call to CLSIDFromProgID( ) is made to obtain the CLSID of the FLO. Using this CLSID, an instance of the FLO is created by calling CoCreateInstance( ). The pointer to the interface obtained in this way is cached in the lookup cache along with the ProgID for future lookups.
3. Using the interface pointer, the Lookup method of this interface is invoked. The input for the lookup method is the sub-string from the input URL string that matches the $N^{th}$ tagged expression in the input URL string of the rule. Syntax might also be provided in the tagged expression to specify more than one string obtained from the input URL string to be passed to Lookup method. This can provide for more powerful lookups.
4. The output or result of the Lookup method replaces the tagged expression in the output expression.
5. If the Lookup fails, the rule is considered unsuccessful and processing continues just like it would after a rule fails.

The ISWFriendlyLookup interface has the following method:

Lookup( )—This method takes as input a string (obtained as explained above) and returns a pointer to a string buffer pointer. The callee allocates memory to hold the output of the Lookup( ) and the caller frees the buffer.

```
HRESULT Lookup
(
    [in] LPCWSTR pwszSource,
    // pointer to a buffer containing the string that
    // the Lookup method needs for doing the lookup
    [in, out] LPWSTR * ppwszDestination
    // a pointer to a buffer that will hold a pointer
    // to the actual string allocated by the callee.
    // The callee must use IMalloc:Alloc to allocate
    // the memory.
);
```

Various embodiments of the invention described above provide for a flexible and generic solution to the problem of mapping input URL strings to output URL strings. Rules for mapping can now be changed, i.e. added, deleted, or modified dynamically, without the need to access and rewrite code, or shut down the communication network server. And, while the described embodiments have been described in terms of processing input URL strings, it is possible that other inputs can be used as well. For example, various mapping methods and systems can use other information as inputs, such as that gleaned from an http header. Examples of such other information include cookies, user agent, user browser capabilities and the like. Typically, these are provided as strings. Thus, in these methods and systems, there are two or more inputs to the mapping engine. For example, the two methods specified just below can enable the use of two regular expressions (e.g. one for the URL, and one to process on all of the headers) in order to process the rules.

```
HRESULT AddRuleWithHeader
(
    [in] DWORD dwGroupID,
    [in] ERuleAction eRuleAction,
    [in] LPCSTR pszSrcString,
    [in, optional] LPCSTR pszSrcHeaderString,
    [in] LPCSTR pszDestString,
    [in] LPCSTR pszAccelerator
);
HRESULT ProcessUrlWithHeader
(
    [in] LPCSTR pszUrl,
    [in, optional] LPCSTR pszHeaders,
    [in] DWORD dwGroupMaskID,
    [in, out] LPSTR pszNewUrl,
    [in] UINT cchSize
);
```

Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of mapping a URL string comprising:

searching for a particular pattern in an input URL string, the pattern being defined in a manner which permits variability among its constituent parts; and replacing the input URL string with an output URL string if the pattern is found in the input URL string;

wherein the particular pattern is specified as a regular expression comprising a character string that includes literal characters and special characters, wherein the literal characters indicate exact characters in the input URL string and the special characters indicate variable characters in the input URL string.

2. A method of mapping a URL string comprising:

searching for a plurality of patterns in an input URL string using a plurality of regular expressions, wherein the regular expressions comprise literal characters and special characters, wherein the literal characters indicate exact characters in the input URL string and the special characters indicate variable characters in the input URL string; and replacing the input URL string with an output URL string if the patterns are found in the input URL string.

3. A method of mapping a URL string comprising:

accessing a plurality of input expressions, each of which describing a different pattern, wherein the input expressions are each associated with an output expression;

checking an input URL string against the input expressions to determine a matching input expression; and generating an output URL string from the output expression associated with the matching input expression, the output expression containing an identifier which represents a portion of the input URL string.

4. The method of claim 3 further comprising generating an output URL string by replacing the identifier with said portion that was represented by said identifier.

5. A method of mapping a URL string comprising:

accessing a plurality of input expressions, each of which describing a different pattern, wherein the input expressions are arranged in a particular order, and wherein the input expressions are each associated with an output expression;

checking an input URL string against the input expressions to determine a matching input expression, wherein the checking of the input URL string comprises starting with a first of the input expressions and proceeding in a stepwise fashion through the input expressions; and generating an output URL string from the output expression associated with the matching input expression.

6. A method of mapping a URL string comprising:

accessing a plurality of input expressions, each of which describing a different pattern, wherein the input expressions are each associated with an output expression;

checking an input URL string against the input expressions to determine a matching input expression; and generating an output URL string from the output expression associated with the matching input expression using at least a portion of the output expression to invoke a lookup procedure which produces a result, and using the result to generate the output URL string.

7. The method of claim 6, wherein a plurality of different lookup procedures can be invoked by output expressions.

8. The method of claim 6, wherein the lookup procedure is specified in the output expression.

9. A method of mapping a URL string comprising:

defining a plurality of rules, wherein each rule specifies:

a text pattern; and a corresponding output expression;

wherein at least some of the text patterns correspond to more than one combination of text characters;

evaluating the rules against a first URL string to identify a rule specifying a text pattern corresponding to the first URL string; and replacing the first URL string with an output URL string specified by the output expression of the identified rule.

10. The method of claim 9 further comprising:

establishing a plurality of rule groups, each rule group having one or more rules; and wherein said evaluating comprises selecting a rule group and evaluating rules of the selected rule group against the first URL string.

11. The method of claim 9 further comprising:

establishing a plurality of rule groups, each rule group having one or more rules; and wherein said evaluating comprises selecting at least one rule group and evaluating rules in the selected group against the first URL string.

12. The method of claim 9 further comprising:

establishing a plurality of rule groups, each rule group having one or more rules;

assigning a group identifier to each group;

using the group identifier to identify a group in which a rule change is to take place; and implementing a rule change based upon the group identifier.

13. The method of claim 12 wherein the rule change which is to take place comprises at least one of a rule addition, a rule deletion, and a rule modification.

14. The method of claim 9 further comprising:

establishing a plurality of rule groups in which individual rules can be placed;

assigning a group tag to each rule group, the group tag specifying a particular protocol for imposing the rules; and wherein the evaluating comprises recognizing a group tag and responsive thereto, implementing the protocol specified by the group tag.

15. The method of claim 14, wherein said particular protocol comprises one of the following protocols:

a match-all protocol in which if a rule is satisfied within a group, the output of the rule becomes the input for its successor rule in the group; and a match-one protocol in which if a rule is satisfied, the output of the rule is passed outside of the group.

16. The method of claim 9 further comprising:

establishing a plurality of rule groups in which individual rules can be placed;

assigning each rule group a group mask;

receiving a group mask key which can select one or more rule groups; and using the group mask key to select one or more rule groups, wherein the evaluating comprises evaluating rules from each of the rule groups selected with the group mask key.

17. The method of claim 16, wherein the group mask comprises a bit mask having a plurality of bits, and the group mask key comprises a bit mask key, and wherein one or more of the rule groups is selected by logically combining the bit mask and the bit mask key.

18. The method of claim 9, wherein the rules are bi-directional in a manner in which the output URL string can be replaced with the first URL string.

19. A computer-readable medium having stored thereon a program for mapping a URL string, the program comprising the following steps:

establishing a rule cache having individual rules that define corresponding patterns in terms of input expressions, wherein the input expressions comprise literal characters and special characters, wherein the literal characters indicate exact characters in an input URL string and the special characters indicate variable characters in the input URL string;

evaluating at least one of the rules from the rule cache against an input URL string to determine whether the input URL string satisfies said at least one rule by matching its pattern; and transforming the input URL string into an output URL string which is different from the input URL string in the event that the input URL string satisfies said at least one rule.

20. A computer-readable medium as recited in claim 19, wherein:

individual rules define output expressions corresponding to the input expressions; and the transforming of the input URL string comprises evaluating the output expression defined by said at least one rule, wherein the output expression contains an identifier which represents a portion of the input URL string, and further comprising replacing the identifier in the output expression with said portion of the input URL string to generate the output URL string.

21. A computer-readable medium as recited in claim 19, wherein the establishing of the rule cache comprises:
arranging individual rules into a plurality of rule groups; and
prior to said evaluating, selecting at least one of the rule groups, wherein said evaluating comprises evaluating at least one rule from the selected rule group.

22. A computer-readable medium as recited in claim 21, wherein each rule group is assigned a group mask, and wherein said selecting comprises logically combining a group mask key with the group mask for each group, and selecting one or more groups if the logical combination of the group mask and the group mask key yields a particular result.

23. A URL-mapping system comprising:
a server configured to receive a first URL string from a client; and
a mapping engine that receives the first URL string and transforms the first URL string into a second URL string by evaluating a plurality of rules against the first URL string, wherein the rules are defined as regular expressions comprising literal characters and special characters, wherein the literal characters indicate exact characters in an input URL string and the special characters indicate variable characters in the input URL string.

24. The URL-mapping system of claim 23 further comprising a web-site rendering engine executing on the server, and wherein the first URL string is not in a form in which it can be understood by the web-site rendering engine, and the second URL string is in a form in which it can be understood by the web-site rendering engine.

25. The URL-mapping system of claim 23, wherein the mapping engine is configured to perform at least one lookup procedure in order to provide the second URL string.

26. The URL-mapping system of claim 25, wherein the at least one lookup procedure is specified in a rule.

27. The URL-mapping system of claim 25, wherein a plurality of different lookup procedures are specified in the rules.

28. The URL-mapping system of claim 23, wherein the mapping engine is a COM server having an interface through which its services can be accessed.

29. The URL-mapping system of claim 23, wherein the mapping engine is configured to enable rules to be added, deleted, or modified.

30. A URL mapping system comprising:
a mapping engine having an interface through which its services can be accessed, the mapping engine being configured to transform URL strings from a first format which is not useable by a web-site rendering engine into a second format which is useable by a web-site rendering engine; and
a rule cache useable by the mapping engine, the rule cache being configured to hold plurality of rules which are defined as regular expressions, wherein regular expressions comprise literal characters and special characters, wherein the literal characters indicate exact characters in an input URL string and the special characters indicate variable characters in the input URL string.

31. The system of claim 30 further comprising a plurality of rules in the rule cache that are defined as regular expressions.

32. The system of claim 31, wherein the rules are arranged into rule groups within the rule cache, and each rule group includes a group identifier which permits individual groups to be accessed to enable rules to be changed.

33. The system of claim 31, wherein the rules are arranged into rule groups within the rule cache, and each rule group includes a group tag which specifies a protocol for applying the rules within a particular group.

34. The system of claim 31, wherein the rules are arranged into rule groups within the rule cache, and each rule group includes a group mask which permits one or more groups to be selected for imposition of at least some of the rules contained therein on the first URL.

35. The system of claim 31, wherein the interface comprises methods to modify rules.

36. The system of claim 31, wherein the interface comprises methods to arrange rules into rule groups.

37. A method of mapping a URL string comprising:
receiving an input URL string;
mapping the input URL string to an output expression having a tagged expression;
using the tagged expression to invoke a lookup method which produces a result; and
replacing the tagged expression in the output expression with the lookup method result to provide an output URL string.

38. The method of claim 37, wherein the tagged expression indicates a lookup method, and wherein the using of the tagged expression comprises invoking the lookup method.

39. A URL mapping engine comprising an interface that exposes a plurality of methods that are associated with managing rules that govern mapping capabilities of the URL mapping engine, wherein the rules are defined by regular expressions.

40. A URL mapping engine comprising an interface that exposes a plurality of methods that are associated with managing rules that govern mapping capabilities of the URL mapping engine, wherein the rules are defined by input expressions and output expressions.

41. A URL mapping engine comprising an interface that exposes a plurality of methods that are associated with managing rules that govern mapping capabilities of the URL mapping engine, wherein the methods comprise a method that permits rules to be added.

42. A URL mapping engine comprising an interface that exposes a plurality of methods that are associated with managing rules that govern mapping capabilities of the URL mapping engine, wherein the methods comprise a method that permits new groups of rules to be added.

43. A URL mapping engine comprising an interface that exposes a plurality of methods that are associated with managing rules that govern mapping capabilities of the URL mapping engine, wherein the methods comprise a method that permits rules to be removed.

44. A URL mapping engine comprising an interface that exposes a plurality of methods that are associated with managing rules that govern mapping capabilities of the URL mapping engine, wherein the methods comprise a method that permits groups of rules to be removed.

45. A URL mapping engine comprising an interface that exposes a plurality of methods that are associated with managing rules that govern mapping capabilities of the URL mapping engine, wherein the rules that are governed are rules that are defined by a syntax that permits variations in text characters in individual rules.

46. A URL mapping engine comprising an interface that exposes a plurality of methods that are associated with managing rules that govern mapping capabilities of the URL mapping engine, wherein:

the rules are defined by regular expressions; and the methods comprise a method that permits rules to be added, and another method that permits a group of rules to be added.

* * * * *